United States Patent
Keysers et al.

(10) Patent No.: US 9,251,412 B2
(45) Date of Patent: Feb. 2, 2016

(54) SEGMENTATION OF DEVANAGARI-SCRIPT HANDWRITING FOR RECOGNITION

(71) Applicant: Google Inc., Mountain View, CA (US)

(72) Inventors: Daniel Martin Keysers, Stallikon (CH); Thomas Deselaers, Zurich (CH); Henry Allan Rowley, Sunnyvale, CA (US)

(73) Assignee: Google Inc., Mountain View, CA (US)

(*) Notice: Subject to any disclaimer, the term of this patent is extended or adjusted under 35 U.S.C. 154(b) by 85 days.

(21) Appl. No.: 14/106,893

(22) Filed: Dec. 16, 2013

(65) Prior Publication Data
US 2015/0169949 A1    Jun. 18, 2015

(51) Int. Cl.
*G06K 9/34*    (2006.01)
*G06K 9/00*    (2006.01)

(52) U.S. Cl.
CPC .................. *G06K 9/00416* (2013.01)

(58) Field of Classification Search
CPC ............ G06K 9/00; G06K 9/03; G06K 9/18; G06K 9/32; G06K 9/62; G06K 9/46; G06K 9/00409; G06K 9/00422; G06K 9/3283; G06K 9/222; G06F 3/04883; G06F 3/0488; G06F 3/03545; G06F 17/243; G01B 11/26; G09G 5/00; H04N 1/407; H04N 1/46; H04N 1/40
USPC ......... 382/181, 187, 189, 186, 224, 228, 161, 382/155, 159, 190, 195, 202, 185, 197, 309, 382/311, 160, 188, 209, 173
See application file for complete search history.

(56) References Cited

U.S. PATENT DOCUMENTS

| | | | |
|---|---|---|---|
| 7,474,804 B2* | 1/2009 | Yang | 382/296 |
| 8,768,062 B2* | 7/2014 | Lakshmanan et al. | 382/186 |
| 8,849,034 B2* | 9/2014 | Bhaskarabhatla | 382/187 |
| 2006/0126936 A1* | 6/2006 | Bhaskarabhatla | 382/187 |
| 2012/0114245 A1* | 5/2012 | Lakshmanan et al. | 382/186 |

OTHER PUBLICATIONS

Shaw et al.,"Offline Handwritten Devanagari Word Recognition: A Segmentation Based Approach", International Conference on Information Technology, pp. 256-257, Dec. 17-20, 2008.*

Joshi et al.,"Machine Recognition of Online Handwritten Devanagari Characters", Proceedings of the Eighth International Conference on Document Analysis and Recognition, pp. 1156-1160, vol. 2, Aug. 29-Sep. 1, 2005.

(Continued)

*Primary Examiner* — Sheela C Chawan
(74) *Attorney, Agent, or Firm* — Remarck Law Group PLC

(57) ABSTRACT

Methods and systems for recognizing Devanagari script handwriting are provided. A method may include receiving a handwritten input and determining that the handwritten input comprises a shirorekha stroke based on one or more shirorekha detection criteria. Shirorekha detection criteria may be at least one criterion such as a length of the shirorekha stroke, a horizontality of the shirorekha stroke, a straightness of the shirorekha stroke, a position in time at which the shirorekha stroke is made in relation to one or more other strokes in the handwritten input, and the like. Next, one or more recognized characters may be provided corresponding to the handwritten input.

36 Claims, 4 Drawing Sheets

(56) References Cited

OTHER PUBLICATIONS

Mishra, Nitin et al.,"Shirorekha Chopping Integrated Tesseract OCREngine for Enhanced Hindi Language Recognition", International Journal of Computer Applications (0975-8887), vol. 39, No. 6, pp. 19-23, Feb. 2012.

Yaeger et al.,"Combining Neural Networks and Context-Driven Search for Online, Printed Handwriting Recognition in the Newton", AI Magazine, vol. 19, No. 1, pp. 73-90, 1998.

* cited by examiner

SEGMENTATION OF DEVANAGARI-SCRIPT HANDWRITING FOR RECOGNITION

BACKGROUND

Devanagari is an alphabet commonly used throughout India and Nepal. Devanagari script is written from left to right, does not have distinct letter cases, and is recognizable by a horizontal line that runs along the top of full letters, typically referred to as a shirorekha stroke. Devanagari is used to write Standard Hindi, Marathi, Nepali along with Awadhi, Konkani, Magahi, Maithili, Marwari, and several other Indic languages. Because it is the standardized script for the Hindi language, Devanagari is one of the most used and adopted writing systems in the world.

In typical handwriting recognition systems, a computer may receive and interpret intelligible text input from sources such as paper documents, photographs, touch-screens and other devices. Among various recognition techniques, a complete handwriting recognition system also handles formatting, performs correct segmentation into characters and finds the most plausible words. Handwriting recognition of Devanagari script, however, can be challenging because of the shirorekha stroke that connects individual characters.

BRIEF SUMMARY

According to an implementation of the disclosed subject matter, a method may include receiving a handwritten input and determining that the handwritten input comprises a shirorekha stroke based on one or more shirorekha detection criteria. Next, one or more recognized characters may be provided corresponding to the handwritten input.

An implementation of the disclosed subject matter provides a system including a processor configured to receive a handwritten input and determine that the handwritten input includes a shirorekha stroke based on one or more shirorekha detection criteria. Next, one or more recognized characters may be provided corresponding to the handwritten input.

Implementations of the disclosed subject matter provide methods and systems for detecting and segmenting Devanagari script handwriting for recognition. Techniques disclosed herein allow for recognition of Devanagari script using segment and decode approaches to online handwriting recognition. By detecting Devanagari script, handwriting that comprises a shirorekha stroke may be recognized with the same efficiency and accuracy as any Latin language handwriting recognition. Furthermore, detecting the shirorekha stroke permits improved Devanagari character segmentation and allows for more accurate handwriting recognition. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
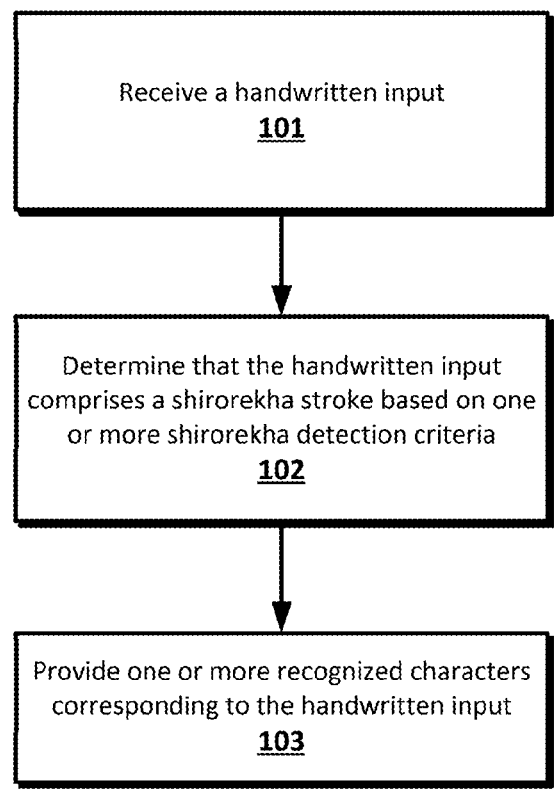
FIG. 1 shows an example process according to an implementation of the disclosed subject matter.

Devanagari script (and other Indic scripts such as Punjabi and Bengali), as opposed to, e.g., Latin and Cyrillic script, are characterized by a top line connecting the individual characters, which is referred to as a shirorekha. Typical online handwriting recognition systems that implement a segment and decode technique for recognizing characters in a script may lead to problems when attempting to recognize Devanagari script. Here, "online" refers to receiving input from a recorded sequence of positions of pen or finger (in contrast to offline recognition, where the input is a photograph or scanned image, such as in optical character recognition (OCR)). In particular, online handwriting recognition involves the automatic conversion of text as it is written in a handwritten input area on a device, where a sensor picks up the pen-tip movements as well as pen-up/pen-down switching. This kind of data is known as digital ink and can be regarded as a digital representation of handwriting. The obtained signal is converted into letter codes which are usable within computer and text-processing applications. One difficulty in implementing the typical segment and decode technique to Devanagari script results from the shirorekha line which often joins multiple character hypotheses that may be decoded. The segment and decode technique relies on being able to identify character hypotheses for a given handwritten observation, then classifying these hypotheses independently, and combining the various local decisions in a global search step to identify recognized characters for output.

Some other handwriting recognition systems follow a hidden Markov model (HMM) based recognition approach which does not require segmentation of a string of characters into explicit character hypotheses, but rather recognizes an entire string of characters using a hidden Markov model. This HMM based recognition may encounter problems when attempting to recognize an entire string of characters connected by the shirorekha stroke. A similar problem occurs for the recognition of offline handwriting (i.e. from a scanned image), where different methods are used, e.g. a removal using morphological operators. Further, recognition of single characters in Devanagari script does not pose the same challenges as recognizing strings of characters that include characters which are connected by the shirorekha stroke.

The present disclosure provides systems and methods for detecting Devanagari script handwriting for recognition. In general, in order to recognize Devanagari script, the present disclosure provides a process including, first, detecting the presence of a shirorekha stroke in a handwriting input. Next, the handwriting input may be provided to a handwriting recognizer for further recognition processing; for example, the handwriting input may be segmented into multiple segments, each segment may be recognized based on a character hypothesis, and a match may be identified between a segment and a known character.

Implementations of the disclosed subject matter provide methods and systems for recognizing Devanagari script text. FIG. 1 shows an example process according to an implementation of the disclosed subject matter. A method may include receiving a handwritten input, at 101. Handwritten input may be received from a user in a handwritten input area of a device, such as a touch screen, touch pad, mobile device, and the like. The handwritten input may include multiple characters connected by a shirorekha stroke. It may be determined that the handwritten input includes a shirorekha stroke based on shirorekha detection criteria, at 102.

Detection of a shirorekha stroke may be based on a variety of shirorekha detection criteria. For example, a shirorekha detection criterion may be a length of the shirorekha stroke. In general, a shirorekha stroke will extend horizontally across the top (or near the top) of all the characters in a string of characters. As such, a shirorekha stroke is typically the longest length horizontal stroke in a string of characters. Horizontality of a shirorekha stroke may also be a shirorekha detection criterion. A structural feature of a shirorekha stroke is that it is a line that extends substantially horizontally in relation to vertical strokes in a string of characters. There is typically no pitch or angle between a shirorekha stroke and the top of a string of characters. Another shirorekha detection criterion may be a straightness of the shirorekha stroke. A shirorekha stroke is typically characterized as being a straight line without any curves or bends. The timing of when a shirorekha stroke is drawn may also be a shirorekha detection criterion. In particular, a position in time at which the shirorekha stroke is made in relation to other strokes in the handwritten input may indicate that a stroke is a shirorekha stroke. For example, for a single word including a certain number of characters, a shirorekha stroke may be the first stroke such that it is drawn first, followed by all the strokes corresponding to the characters in the word being drawn substantially below the shirorekha stroke. Alternatively, the shirorekha stroke may be the last stroke of the handwriting input such that once all the strokes corresponding to characters in the word have been drawn, the shirorekha stroke may be added last across the top of the word. Other suitable criteria may be used for detecting the presence of a shirorekha stroke in handwriting input by extracting structural features at the stroke level of the handwriting input.

According to an implementation, a shirorekha detection score may be assigned to the handwritten input. In some cases, determining that the handwritten input includes a shirorekha stroke may be based on the handwritten input having a shirorekha detection score above a minimum threshold score. A handwritten input may include multiple strokes and the step of determining that the handwritten input comprises a shirorekha stroke may include evaluating each of the multiple strokes based on the shirorekha detection criteria. For example, each of the shirorekha detection criterion may be associated with a score value. A handwritten input may contain multiple strokes and each stroke may be evaluated based on the shirorekha detection criterion. Each stroke may receive a score for each shirorekha criterion and these scores may be added together to generate a shirorekha detection score for each stroke. As a result, all strokes having a shirorekha detection score above a given threshold score may be determined to be shirorekha strokes.

Once it has been determined that a handwritten input includes a shirorekha stroke, one or more recognized characters may be provided corresponding to the handwritten input, at 103. In general, a handwriting recognition system may provide one or more recognized characters corresponding to the handwritten input based on a variety of handwriting recognition techniques. One technique may be to segment the handwritten strokes (including the shirorekha) into multiple segments. Each segment may be classified into a known set of characters, for example by comparing each segment with a set of known samples. In some cases, a single character in a handwritten input may be comprised of multiple segments from different strokes (e.g., a 't' with its crossing stroke, or a character with an associated portion of the shirorekha stroke). In this case, a subset or group of the multiple segments may be classified as described herein. As a result, one or more recognized characters for each segment may be provided based on a match between the segment and one or more known characters. In other cases, the shirorekha stroke may be removed from the handwritten input. This step of removing the shirorekha stroke may be performed either before or after the handwritten input is segmented into multiple segments. As an example, removal of the shirorekha stroke, from the entire handwritten input or the multiple segments, may be performed in cases where the characters in a set of known characters do not include a shirorekha line as part of each character. This may allow for more accurate and efficient matching of the handwritten input or the segment with characters in the set of known characters for recognition.

Figure 2:
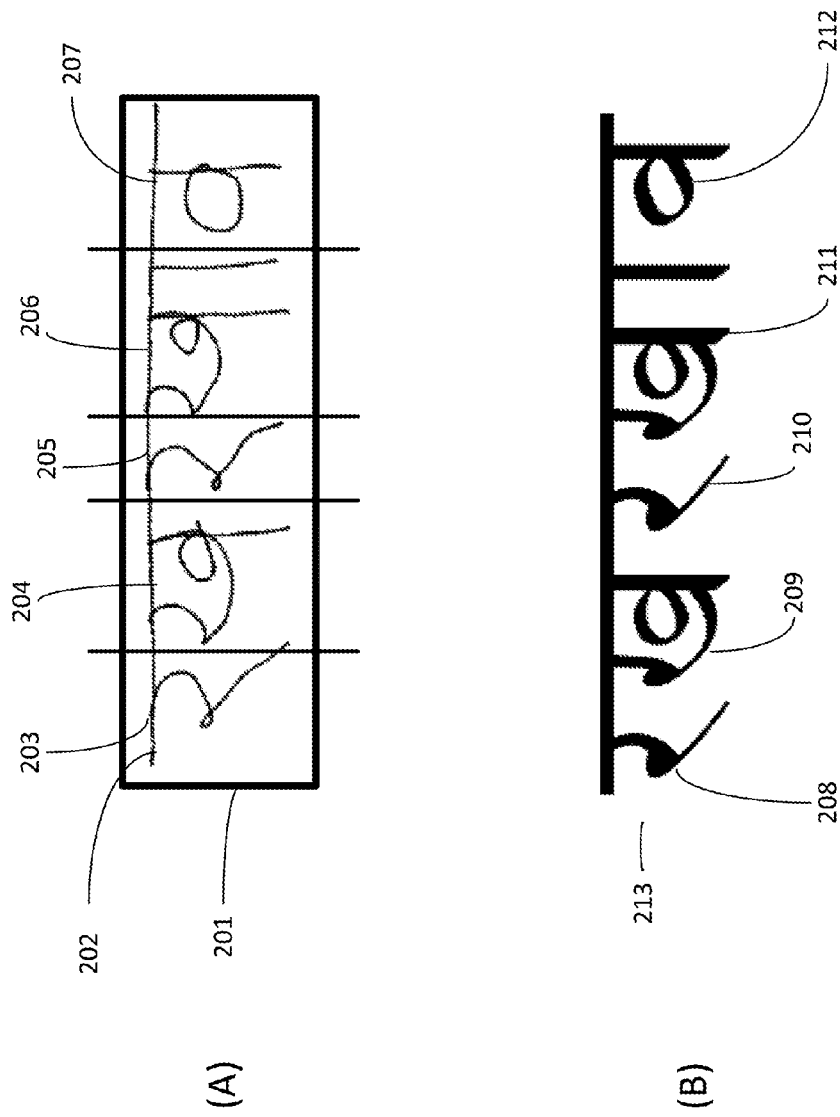
FIG. 2 shows an example handwritten input and recognized characters according to an implementation of the disclosed subject matter.

According to an implementation, a system may include a processor configured to receive a handwritten input and determine that the handwritten input includes a shirorekha stroke based on one or more shirorekha detection criteria. FIGS. 2 (A) and (B) show an example handwritten input and recognized characters according to an implementation of the disclosed subject matter. As shown in FIG. 2(A), a handwritten input 201 may be received and it may include a horizontal stroke 202 and multiple strokes that make up multiple characters 203, 204, 205, 206, and 207. As shown, the horizontal stroke 202 may connect each of the characters 203, 204, 205, 206, and 207. Each of the strokes in the handwritten input 201 may be evaluated based on shirorekha detection criteria. For example, all of the strokes in the handwritten input 201 may be evaluated based on shirorekha detection criteria such as length, horizontality, straightness, and a position in time at which each stroke was made in relation to other strokes in the handwritten input 201. Based on this evaluation, each stroke may receive a score for each criterion and these scores may be added together to generate a shirorekha detection score for each stroke. As shown in FIG. 2, each of 202, 203, 204, 205, 206, and 207 may comprise a portion of a stroke or multiple strokes, in which case, each stroke may be evaluated based on the shirorekha detection criteria. For purposes of this example, however, each of 202, 203, 204, 205, 206, and 207 may be considered a stroke. Table 1 below shows the scores assigned to each stroke based on the shirorekha detection criteria.

TABLE 1

| | Shirorekha Detection Criteria | | | | |
|---|---|---|---|---|---|
| Stroke | Length | Horizontality | Straightness | A position in time at which the stroke was made in relation to other strokes | Total Score |
| 202 | 5 | 5 | 5 | 5 | 20 |
| 203 | 1 | 2 | 1 | 4 | 8 |
| 204 | 2 | 2 | 1 | 2 | 7 |

TABLE 1-continued

Shirorekha Detection Criteria

| Stroke | Length | Horizontality | Straightness | A position in time at which the stroke was made in relation to other strokes | Total Score |
|---|---|---|---|---|---|
| 205 | 1 | 2 | 1 | 1 | 5 |
| 206 | 2 | 1 | 1 | 2 | 6 |
| 207 | 1 | 2 | 1 | 4 | 8 |

As shown in Table 1, each stroke may be evaluated based on each of the shirorekha detection criterion and may be assigned a score, for example, from 1-5, with a score of 1 indicating a low indication of the criterion and a score of 5 indicating a high indication of the criterion. For each stroke, the scores for each of the criterion may be added together to generate a total score. As a result, all strokes having a shirorekha detection score above a given threshold score may be determined to be shirorekha strokes. As an example, a minimum threshold score of 15 and higher may indicate that a stroke is a shirorekha stroke. In this case, horizontal stroke 202 received a shirorekha detection score of 20 which is above the given threshold score of 15. Accordingly, it may be determined that horizontal stroke 202 is a shirorekha stroke. In general, a score for a shirorekha detection criterion may or may not be in the form of an integer, and may be any value that may suitable for assigning a score. An overall score given to a stroke may be a weighted sum of the individual scores, which can be determined manually or by an automated technique like a linear or logistic regression. In general, the determination that a stroke is a shirorekha stroke may be performed by a machine-learning based system that uses the described techniques (and others) as input, such as, logistic regression, a neural network, or a support vector machine. Other shirorekha detection techniques may be used to detect a shirorekha stroke, such as a machine learning method based on heuristic rules, which may or may not be similar to the shirorekha detection criteria described herein.

The handwritten input 201 also may be segmented into a plurality of segments as shown in FIG. 2 (A). Segmenting the handwritten input 201 may be performed according to any standard segmenting approach used in handwriting recognition systems. In general, a segment may include one or more strokes that may correspond to a portion of a character, an entire character, multiple characters, or any combination thereof. In some cases, one or more segments may overlap with one another. As an example, a handwritten input may consist of two strokes that look like "cl". This handwritten input may be segmented into the segments "c", "l", and "cl". One or more subsets of each of these segments may be classified providing candidate characters "c", "l", and "cl". As another example, the shirorekha stroke 202 may be segmented into substrokes such as segments 203, 204, 205, 206, and 207. All the strokes in each of the segments 203, 204, 205, 206, and 207 may be considered candidate characters and may be provided to a character classifier, which may be part of a handwriting recognition system. Other segmenting techniques may be used to segment a detected shirorekha stroke, such as a segmenting approach that may depend on the number of strokes which overlap horizontally with a detected shirorekha stroke. For example, the number of other strokes may provide an estimate as to the number of characters present in a handwritten input which may suggest where to segment the handwritten input and how many segments should be made.

Each segment 203, 204, 205, 206, and 207 may be recognized. In general, recognition of a segment or group of segments may be performed according to any standard classification approach used in handwriting recognition. For example, a segment may be classified and/or a label associated with the segment may be predicted. Techniques for classifying and/or labeling a segment may be used to identify a recognized character based on the received handwritten input and may be performed by any suitable system such as a machine learning system. In general, each segment, and in some cases, groups of segments, for example including the shirorekha stroke and/or parts of the shirorekha stroke, may be recognized as one or more characters in one classification. In some cases, the handwritten input may be segmented into multiple segments including and each segment may include a segment of the shirorekha stroke. Each segment and/or group of segments may be classified according to a set of known characters. As a result, one or more recognized characters may be provided for each segment and/or group of segments. A handwriting recognition system may find the best explanation of the handwritten input as a text input, taking into account multiple possible segmentations. As a specific example, the character in segment 203 may be compared with a set of known characters and a match may be identified between the character in segment 203 and a known character. A step of character matching and/or prediction may or may not be performed for each segment and/or character individually, and may be based on the context of the multiple segments in a handwritten input. In some cases, the multiple segments may be re-organized into an input for a handwriting recognition system, and the handwriting recognition system may provide one or more recognized characters corresponding to re-organized segment input. Examples of techniques for recognizing a character may include feature extraction followed by classification with neural networks, nearest neighbor search, support vector machines, HMMs, and the like. As a result of classifying each segment 203, 204, 205, 206, and 207, one or more recognized characters for each segment may be provided. Finally, a standard decoding technique may be used to search for the best explanation of the overall input taking into account multiple possible segmentations and also other knowledge sources such as a language model.

As shown in FIG. 2(B), an output of a recognized string of characters 213 may be provided. The recognized string of characters 213 may include recognized characters 208, 209, 210, 211, and 212. Each of the recognized characters 208, 209, 210, 211, and 212 may correspond to a segment of the handwritten input 201. For example, recognized character 208 may correspond to segment 203, recognized character 209 may correspond to segment 204, recognized character 210 may correspond to segment 205, recognized character 211 may correspond to segment 206, and recognized character 212 may correspond to segment 207. Although the example provided shows each recognized character corresponding to a segment, there may be cases where a portion of a recognized character or multiple characters may correspond to a segment.

According to an implementation, the step of segmenting the handwritten input into multiple segments may be performed based on the determination that the handwritten input comprises a shirorekha stroke. Upon detection of a shirorekha stroke, the determination that a stroke is a shirorekha stroke may be used in the segmentation (e.g. the shirorekha stroke may be segmented uniformly or proportionally to the segmentation of the other strokes and/or characters in the handwritten input). In cases in which the shirorekha stroke is segmented along with other strokes and/or characters in the handwritten input, segments of the shirorekha line may be associated with other segments in the handwritten input. In some instances, a segment may include the shirorekha stroke along with one or more other strokes, and the shirorekha stroke may be used for classifying the segment. Additionally, the shirorekha stroke may be handled differently from the other strokes in subsequent steps. For example, upon detection of a shirorekha stroke, recognition of the handwritten input may be performed by techniques developed for handling recognition of delayed strokes in Latin scripts. A common example is putting the dot on a letter "i" or "j", or the horizontal bar of a lower-case letter "t". Such an action can be performed either immediately after writing a character or can be delayed to a later moment. For example, some writers may produce the dots after finishing a word while others may finish a complete sentence or even paragraph of text before producing the delayed strokes for dots and bars. Similarly, a writer may produce a shirorekha stroke first before producing a character, after producing a single character, or after producing a string of characters. In this case, the disclosed on-line handwriting recognition system may attribute each delayed stroke, including the shirorekha stroke, to the correct character in the text production sequence.

Figure 5:
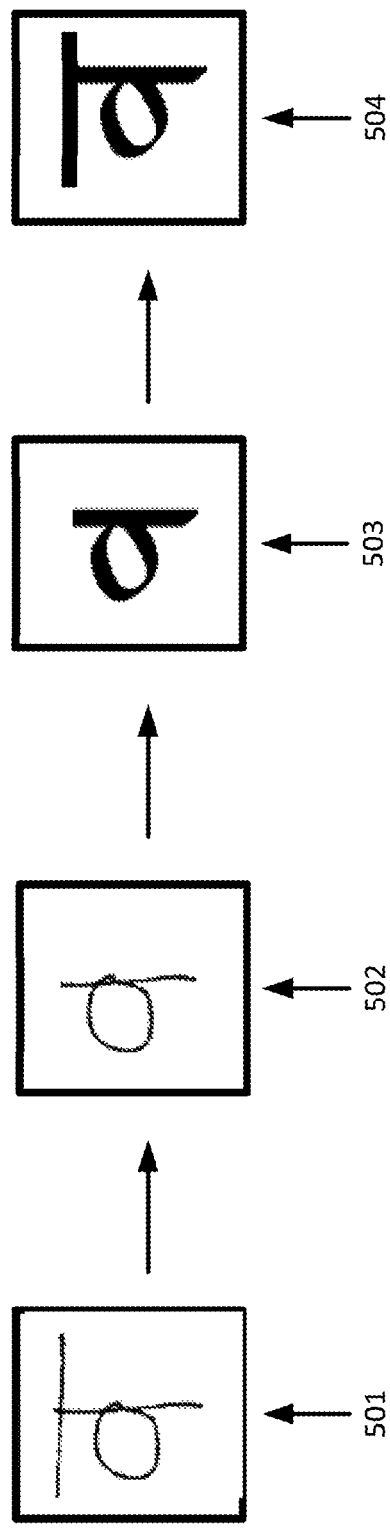
FIG. 5 shows an example handwriting recognition technique.

Another technique for handling recognition of handwritten input having a detected shirorekha stroke may include removing the shirorekha stroke. In this case, once the shirorekha stroke is removed, any handwriting recognition approach may be used to provide one or more recognized characters corresponding to the received handwritten input. Since the characters in Devanagari script are characterized by the shirorekha stroke across the top of a character, the shirorekha stroke may not be considered a distinguishing structural feature of a character when identifying a match in a set of known characters. As such, removal of the shirorekha stroke may allow for more accurate recognition of the portions of a character which may distinguish it from other characters in the set. FIG. 5 shows an example of a shirorekha removal technique. First it may be determined that a received handwritten input includes a shirorekha stroke and the handwritten input may be segmented into multiple segments. A segment of handwritten input 501 may be a character including the shirorekha stroke. The shirorekha stroke may be removed from the character as shown at 502. The character without the shirorekha stroke 502 may be classified by comparing character 502 to a set of known characters. Each of the characters in the set of known characters may also not include a shirorekha line. Character 502 may be matched with known character 503. Based on this match, recognized character 504 including the shirorekha line may be provided.

In an implementation, the communication between a device that can receive a handwritten input and a handwriting recognition provider may be across one or more bridges between the interfaces. For example, the communications between the device and the handwriting recognition provider may be managed or assisted by a third device, such as, a coordinating device, a local coordinator, a remote server, etc. In such cases, the third device may, for example, determining that the handwritten input comprises a shirorekha stroke based on one or more shirorekha detection criteria and provide the handwritten input to the handwriting recognition provider, in which case, the handwriting recognition provider may segmenting the handwritten input and classify the segments and provide the recognized characters for each segment to, either, the third device or directly to the device that received the handwritten input. Alternatively, the third device may segment the handwritten input into a plurality of segments, and provide the segments to the handwriting recognition provider for classifying. Accordingly, the handwriting recognition provider may provide the recognized characters for each segment to. Furthermore, more than one intermediate device may be implemented to facilitate communication between devices and a handwriting recognition provider.

Figure 3:
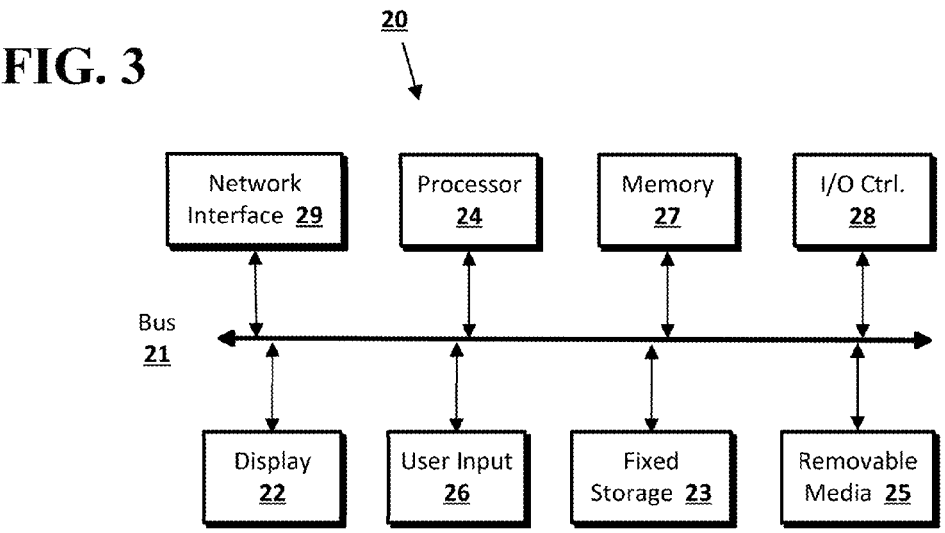
FIG. 3 shows a computer according to an embodiment of the disclosed subject matter.

Embodiments of the presently disclosed subject matter may be implemented in and used with a variety of component and network architectures. FIG. 3 is an example computer 20 suitable for implementing embodiments of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 4.

Many other devices or components (not shown) may be connected in a similar manner (e.g., document scanners, digital cameras and so on). Conversely, all of the components shown in FIG. 3 need not be present to practice the present disclosure. The components can be interconnected in different ways from that shown. The operation of a computer such as that shown in FIG. 3 is readily known in the art and is not discussed in detail in this application. Code to implement the present disclosure can be stored in computer-readable storage media such as one or more of the memory 27, fixed storage 23, removable media 25, or on a remote storage location.

Figure 4:
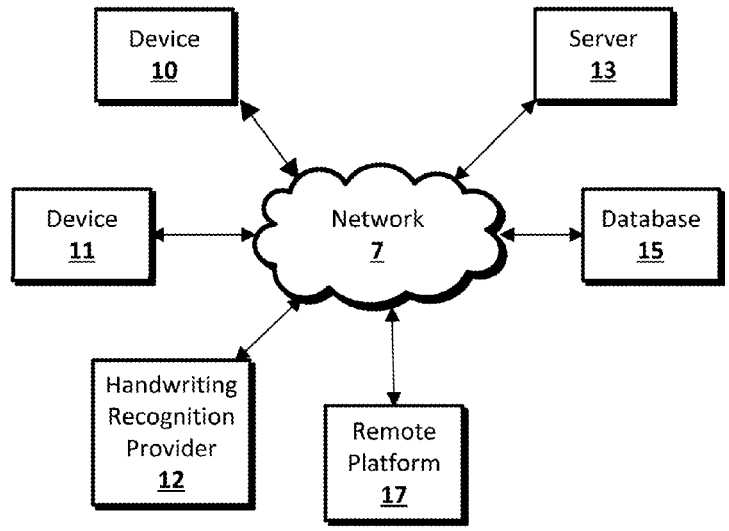
FIG. 4 shows a network configuration according to an embodiment of the disclosed subject matter.

FIG. 4 shows an example network arrangement according to an embodiment of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more handwriting recognition providers 12, servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more handwriting recognition providers 12, servers 13 and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. For example, while certain languages, scripts, phrases, words, and characters were chosen to illustrate the workings of the present disclosure, the teachings of the present disclosure are not so limited, and may apply to any appropriate language, script, and so on. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:
   receiving, at a computing device having one or more processors, a handwritten input that includes a plurality of strokes, the handwritten input comprising a recorded sequence of positions;
   determining, at the computing device, that a particular stroke of the plurality of strokes of the handwritten input comprises a shirorekha stroke based in part on a position in time of the particular stroke in relation to a remainder of the plurality of strokes; and
   providing, from the computing device, one or more recognized characters corresponding to the handwritten input.

2. The method of claim 1, wherein determining that the particular stroke of the plurality of strokes of the handwritten input comprises the shirorekha stroke comprises evaluating each of the plurality of strokes based on the one or more shirorekha detection criteria.

3. The method of claim 2, wherein the one or more shirorekha detection criteria comprises a length of the shirorekha stroke.

4. The method of claim 2, wherein the one or more shirorekha detection comprises a horizontality of the shirorekha stroke.

5. The method of claim 2, wherein the one or more shirorekha detection comprises a straightness of the shirorekha stroke.

6. The method of claim 1, further comprising assigning, at the computing device, a shirorekha detection score to the handwritten input.

7. The method of claim 6, wherein determining that the particular stroke of the plurality of strokes of the handwritten input comprises the shirorekha stroke is based on the handwritten input having a shirorekha detection score above a minimum threshold score.

8. The method of claim 1, further comprising segmenting, at the computing device, the handwritten input into a plurality of segments.

9. The method of claim 8, further comprising classifying, at the computing device, each segment in the plurality of segments by comparing each segment with a set of known characters.

10. The method of claim 9, wherein, for each segment, the step of providing one or more recognized characters corresponding to the handwritten input is based on a match between the segment and one or more known character in the set of known characters.

11. The method of claim 8, wherein the step of segmenting the handwritten input into a plurality of segments is performed based on the determination that the particular stroke of the plurality of strokes of the handwritten input comprises the shirorekha stroke.

12. The method of claim 8, further comprising removing, at the computing device, the shirorekha stroke prior to the step of segmenting the handwritten input into a plurality of segments.

13. The method of claim 8, further comprising re-organizing, at the computing device, the plurality of segments.

14. The method of claim 8, wherein segmenting the handwritten input into the plurality of segments comprises segmenting the shirorekha stroke uniformly.

15. The method of claim 8, wherein segmenting the handwritten input into the plurality of segments comprises segmenting the shirorekha stroke proportionally to segmentation of the other strokes or characters in the handwritten input.

16. The method of claim 1, further comprising removing, at the computing device, the shirorekha stroke from the handwritten input.

17. The method of claim 16, further comprising providing, from the computing device, the handwritten input to a handwriting recognition system.

18. The method of claim 1, wherein the handwritten input comprises a plurality of characters connected by the shirorekha stroke.

19. A system comprising:
a processor configured to:
receive a handwritten input that includes a plurality of strokes, the handwritten input comprising a recorded sequence of positions;
determine that a particular stroke of the plurality of strokes of the handwritten input comprises a shirorekha stroke based in part on a position in time of the particular stroke in relation to a remainder of the plurality of strokes; and
provide one or more recognized characters corresponding to the handwritten input.

20. The system of claim 19, wherein determining that the particular stroke of the plurality of strokes of the handwritten input comprises the shirorekha stroke comprises evaluating each of the plurality of strokes based on the one or more shirorekha detection criteria.

21. The system of claim 20, wherein the one or more shirorekha detection criteria comprises a length of the shirorekha stroke.

22. The system of claim 20, wherein the one or more shirorekha detection criteria comprises a horizontality of the shirorekha stroke.

23. The system of claim 20, wherein the one or more shirorekha detection criteria comprises a straightness of the shirorekha stroke.

24. The system of claim 19, wherein the processor is further configured to assign a shirorekha detection score to the handwritten input.

25. The system of claim 19, wherein determining that the particular stroke of the plurality of strokes of the handwritten input comprises the shirorekha stroke is based on the handwritten input having a shirorekha detection score above a minimum threshold score.

26. The system of claim 19, wherein the processor is further configured to segment the handwritten input into a plurality of segments.

27. The system of claim 26, wherein the processor is further configured to classify each segment in the plurality of segments by comparing each segment with a set of known characters.

28. The system of claim 27, wherein, for each segment, the step of providing one or more recognized characters corresponding to the handwritten input is based on a match between the segment and one or more known character in the set of known characters.

29. The system of claim 26, wherein the step of segmenting the handwritten input into a plurality of segments is performed based on the determination that the particular stroke of the plurality of strokes of the handwritten input comprises the shirorekha stroke.

30. The system of claim 26, wherein the processor is further configured to re-organize the plurality of segments.

31. The system of claim 19, wherein the processor is further configured to remove the shirorekha stroke from the handwritten input.

32. The system of claim 31, wherein the processor is further configured to provide the handwritten input to a handwriting recognition system.

33. The system of claim 31, wherein the processor is further configured to remove the shirorekha stroke prior to the step of segmenting the handwritten input into a plurality of segments.

34. The system of claim 19, wherein the handwritten input comprises a plurality of characters connected by the shirorekha stroke.

35. The system of claim 19, wherein segmenting the handwritten input into the plurality of segments comprises segmenting the shirorekha stroke uniformly.

36. The system of claim 19, wherein segmenting the handwritten input into the plurality of segments comprises segmenting the shirorekha stroke proportionally to segmentation of the other strokes or characters in the handwritten input.

* * * * *